(12) United States Patent
Giordano

(10) Patent No.: US 12,110,981 B2
(45) Date of Patent: Oct. 8, 2024

(54) VALVE FOR FLUIDS, PREFERABLY FOR GASES

(71) Applicant: GIORDANO CONTROLS S.p.A., Villa Bartolomea (IT)

(72) Inventor: Bruno Giordano, Villa Bartolomea (IT)

(73) Assignee: GIORDANO CONTROLS S.p.A., VILLA BARTOLOMEA (IT)

( * ) Notice: Subject to any disclaimer, the term of this patent is extended or adjusted under 35 U.S.C. 154(b) by 10 days.

(21) Appl. No.: 17/755,619

(22) PCT Filed: Nov. 28, 2019

(86) PCT No.: PCT/IB2019/060298
§ 371 (c)(1),
(2) Date: May 3, 2022

(87) PCT Pub. No.: WO2021/105757
PCT Pub. Date: Jun. 3, 2021

(65) Prior Publication Data
US 2022/0390033 A1 Dec. 8, 2022

(51) Int. Cl.
*F16K 39/02* (2006.01)
*F16K 31/06* (2006.01)
*F16K 31/08* (2006.01)

(52) U.S. Cl.
CPC ........ *F16K 31/0655* (2013.01); *F16K 31/082* (2013.01); *F16K 39/022* (2013.01)

(58) Field of Classification Search
None
See application file for complete search history.

(56) References Cited

U.S. PATENT DOCUMENTS 3,441,246 A * 4/1969 Heinz ................ F16K 31/0689
251/52
3,963,049 A  6/1976 Beauregard
(Continued)

FOREIGN PATENT DOCUMENTS

EP  0928892 A1  7/1999
EP  1613881 B1  7/2012
(Continued)

OTHER PUBLICATIONS

International Search Report issued for International Patent Application No. PCT/IB2019/060298, dated Jul. 24, 2020 in 3 pages.

*Primary Examiner* — Matthew W Jellett
(74) *Attorney, Agent, or Firm* — Knobbe, Martens, Olson & Bear, LLP

(57) ABSTRACT

A valve (1) for fluids, preferably for gases, comprises an inlet passage (2); an outlet passage (3); a shutter (4) interposed between the inlet passage (2) and the outlet passage (3) and movable between an open position and a closed position; actuating means (26,27). The valve (1) also comprises actuating means (26,27) operatively active on the shutter (4), which comprises an electromagnet (26) and a ferromagnetic element (27) that is movable as a function of the field generated by the electromagnet (26) for displacing the shutter (4) along the movement direction (L). In particular, the actuating means comprises a tubular body (5) made of non-magnetic material in which the ferromagnetic body (27) is inserted.

27 Claims, 6 Drawing Sheets

(56) References Cited

U.S. PATENT DOCUMENTS

| | | | |
|---|---|---|---|
| 4,251,052 A | | 2/1981 | Hertfelder et al. |
| 4,403,765 A | * | 9/1983 | Fisher .................. H01F 7/1646 335/266 |
| 4,988,074 A | * | 1/1991 | Najmolhoda ...... G05D 16/2024 251/129.08 |
| 5,785,511 A | * | 7/1998 | Shah ....................... F23N 5/107 431/46 |
| 5,897,096 A | | 4/1999 | Nakano |
| 6,047,718 A | | 4/2000 | Konsky et al. |
| 7,111,642 B2 | * | 9/2006 | Takeda ................ F16K 31/0655 137/614.19 |
| 7,905,254 B2 | * | 3/2011 | Takeda ................... F16K 1/443 137/630.22 |
| 8,567,755 B2 | * | 10/2013 | Najmolhoda ......... F16K 31/062 335/229 |
| 2012/0175541 A1 | | 7/2012 | Da Pont et al. |
| 2020/0018414 A1 | | 1/2020 | Lee et al. |

FOREIGN PATENT DOCUMENTS

| | | |
|---|---|---|
| EP | 3414477 B1 | 4/2020 |
| JP | 2020-063834 A | 4/2020 |
| WO | 2013/118050 A1 | 8/2013 |
| WO | 2019/229712 A1 | 12/2019 |

\* cited by examiner

VALVE FOR FLUIDS, PREFERABLY FOR GASES

CROSS-REFERENCE TO RELATED APPLICATIONS

This application is the U.S. National Phase under 35. U.S.C. § 371 of International Application PCT/IB2019/060298, filed Nov. 28, 2019.

TECHNICAL FIELD

The present invention relates to a valve for fluids. In particular, the present valve is used for intercepting gasses at a burner, but could be used in any sector for intercepting, in general, a fluid. Moreover, the present invention relates to a valve of the type having one or more consecutive and independent stages or a single-stage valve.

PRIOR ART

Electromechanical actuators, often also defined as "solenoid valves", are electromechanical components interposed along a pipeline to allow the interception or the adjustment of the flow rate and/or the pressure of a fluid (liquid or gaseous) of interest made to flow in the pipeline.

An example of this type of devices is reported in the documents EP3070381, WO2015/111087 and WO2015/111088, in which a solenoid valve is illustrated having multiple stages cooperating for the adjustment of the quantity of gas that can be transported through the pipeline.

The management of the quantity of fluid passing through the solenoid valve, and therefore along the pipeline, takes place through the control of the movement of a shutter having a high operating precision that allows the solenoid valves to also be used as safety devices.

Usually, the movement of the shutter is obtained through the association of a magnet and an electromagnet to the shutter itself. The variation in the intensity of the magnetic field produced by the electromagnet makes it possible to move the magnet, and therefore the shutter connected to it, between the operating closed position and the operating open position for the passage of the fluid.

However, this movement system based on the magnet/electromagnet pair can suffer malfunctioning capable of reducing the efficiency of the shutter, mainly when the latter has to abut in the closed position for closing the passage of fluid.

During the movement of the magnet, in fact, frictions may be present which cause a minimal inclination with respect to the movement direction. This inclination generates an increase in the distance between the magnet and the area of the passage of the fluid that the shutter must obstruct and, consequently, the latter will not abut in a correct way to bring about an efficient hermetic closure.

As shown in document US2009183510, a second known technique provides for using bearings interposed between the magnet and the electromagnet in order to reduce frictions and correctly align the magnet during its own movement.

However, the use of bearings greatly complicates the structure of the solenoid valve which must be developed and assembled, it increases the maintenance procedures (more frequent) which must check the correct operation of the bearings as well as of the other components and, finally, it increases the production and management costs.

OBJECT OF THE INVENTION

In this context, the technical task of the present invention is to propose a valve for fluids, preferably for gases, which obviates the drawback of the known art as mentioned above.

In particular, the object of the present invention is to provide a valve for fluids able to ensure the correct operation of the shutter, i.e. its correct movement and its correct positioning for opening and closing the passage of the fluid. The stated technical task and specified object are substantially achieved by a valve for fluids, preferably for gases, which comprises the technical features set forth in the independent claim. The dependent claims correspond to further advantageous aspects of the invention.

It should be highlighted that this summary introduces, in simplified form, a selection of concepts which will be further elaborated in the detailed description given below.

The invention relates to a valve for fluids, preferably for gases, which comprises an inlet passage and an outlet passage for the fluid, at least one shutter interposed between these passages and movable along a movement direction between an open position and a closed position. In the open position the shutter allows the flow of the gas from the inlet passage to the outlet passage, while in the closed position the shutter prevents the flow of the gas.

Furthermore, the valve for fluids comprises actuating means of the shutter which in turn comprises an electromagnet adapted to generate a variable magnetic field and a ferromagnetic element associated with said shutter and movable along the movement direction as a function of the magnetic field generated by the electromagnet in order to displace the shutter at least from the closed position into the open position or vice versa.

Advantageously, the actuating means comprises a tubular body at least partially interposed between the electromagnet and the ferromagnetic element. The electromagnet is arranged in a static position with respect to a fixed portion of the valve, while the ferromagnetic element is slidably inserted in the tubular body in order to move along the movement direction as a function of the magnetic field generated by the electromagnet.

Even more advantageously, the tubular body is made of non-magnetic material.

BRIEF DESCRIPTION OF THE DRAWINGS

Additional features and advantages of the present invention will become more apparent from an approximate, and thus non-limiting, description of a preferred, but non-exclusive embodiment of a valve for fluids, preferably for gases, as illustrated in the appended drawings, in which.

With reference to the drawings, they serve solely to illustrate embodiments of the invention with the aim of better clarifying, in combination with the description, the inventive principles at the basis of the invention.

DETAILED DESCRIPTION OF PREFERRED EMBODIMENTS OF THE INVENTION

The present invention relates to a valve for fluids, preferably for gases. With reference to the figures, a valve for fluids, preferably for gases, has been generically indicated with the number 1.

The other numerical references refer to technical features of the invention which, barring indications otherwise or evident structural incompatibilities, the person skilled in the art will know how to apply to all the variant embodiments described.

Any modifications or variants which, in the light of the description, are evident to the person skilled in the art, must be considered to fall within the scope of protection established by the present invention, according to considerations of technical equivalence.

Figure 1:
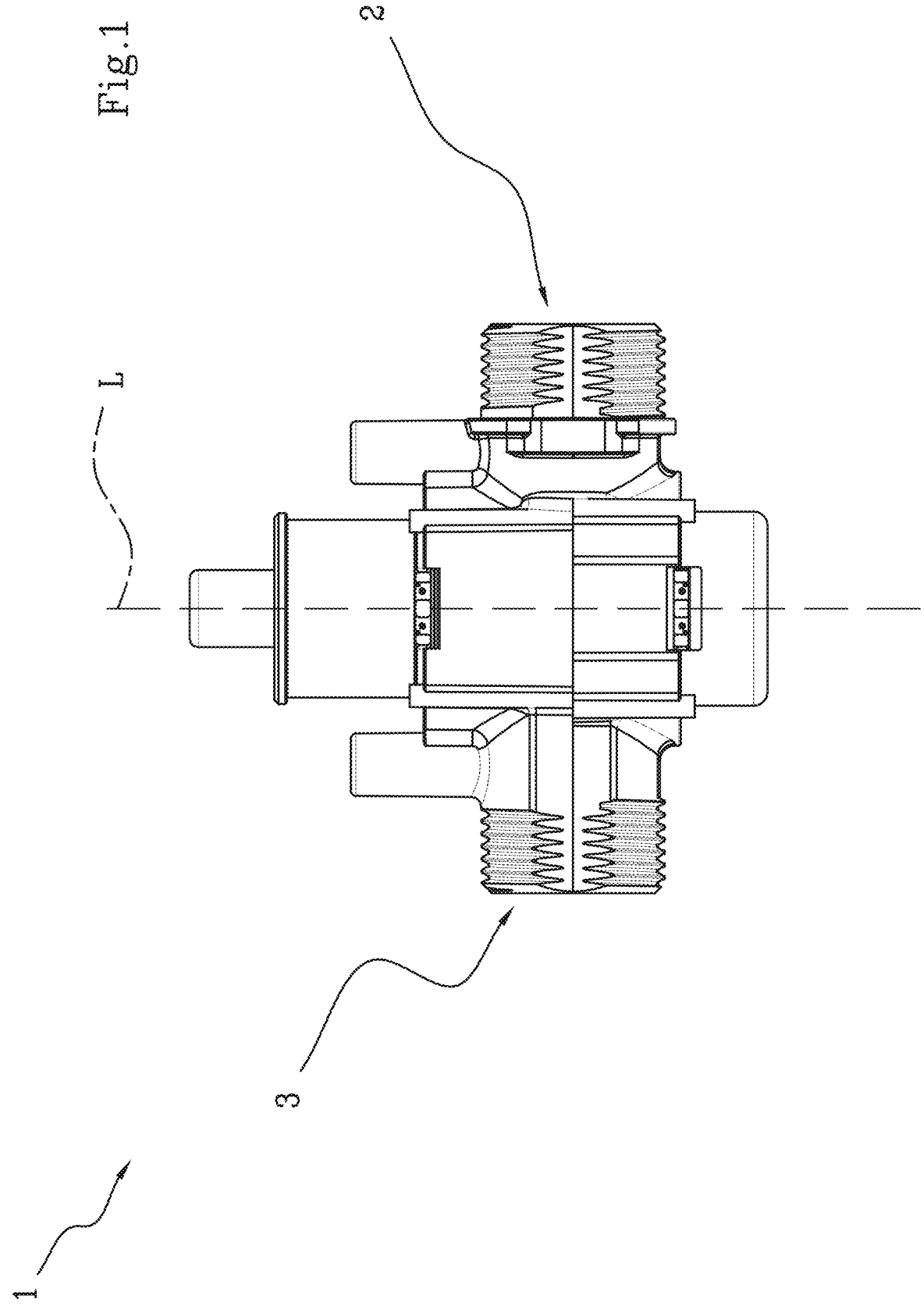
FIG. 1 illustrates a front view of a valve for fluids.
Figure 4:
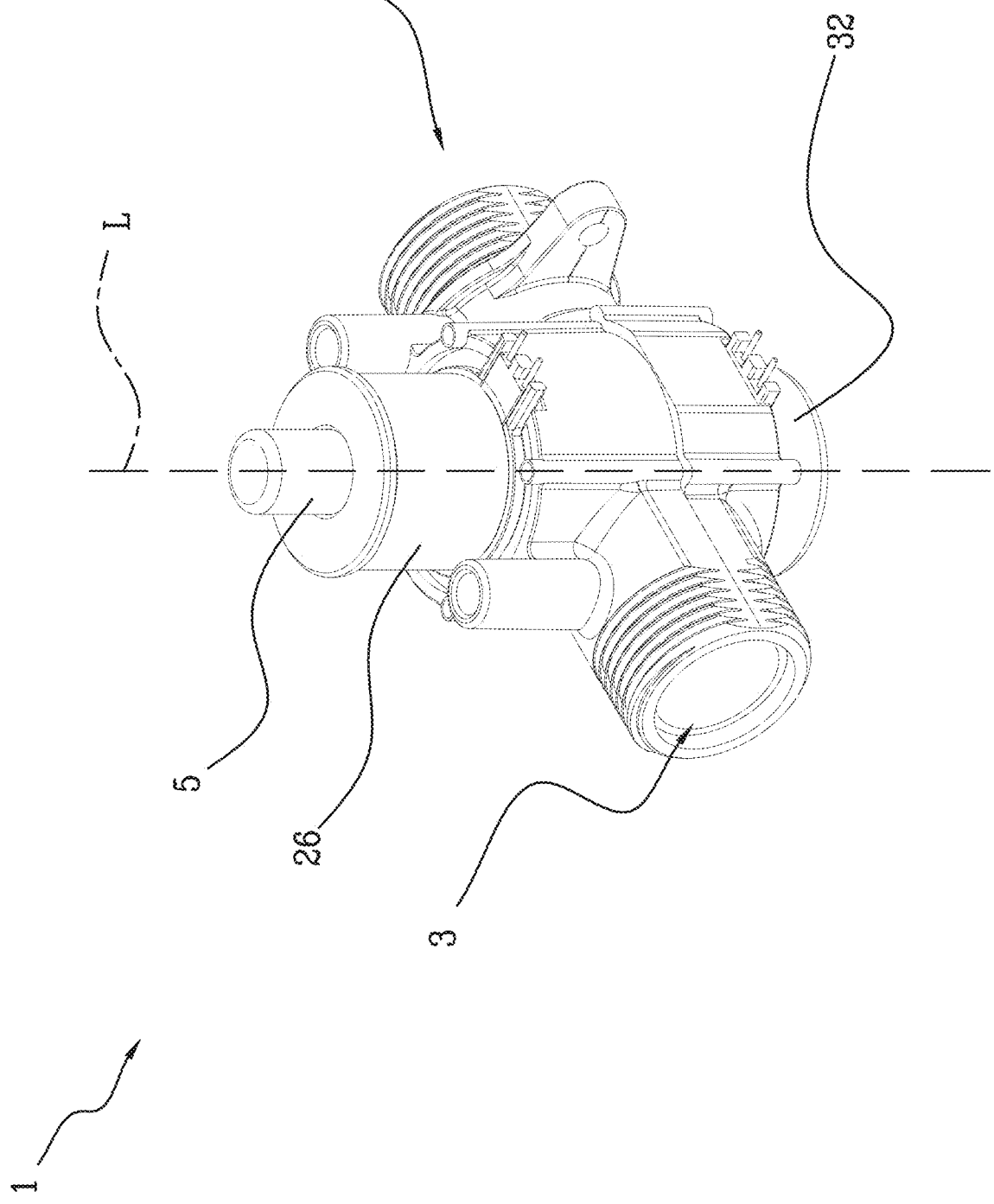
FIG. 4 illustrates a perspective view of a valve for fluids illustrated in FIG. 1.
Figure 5:
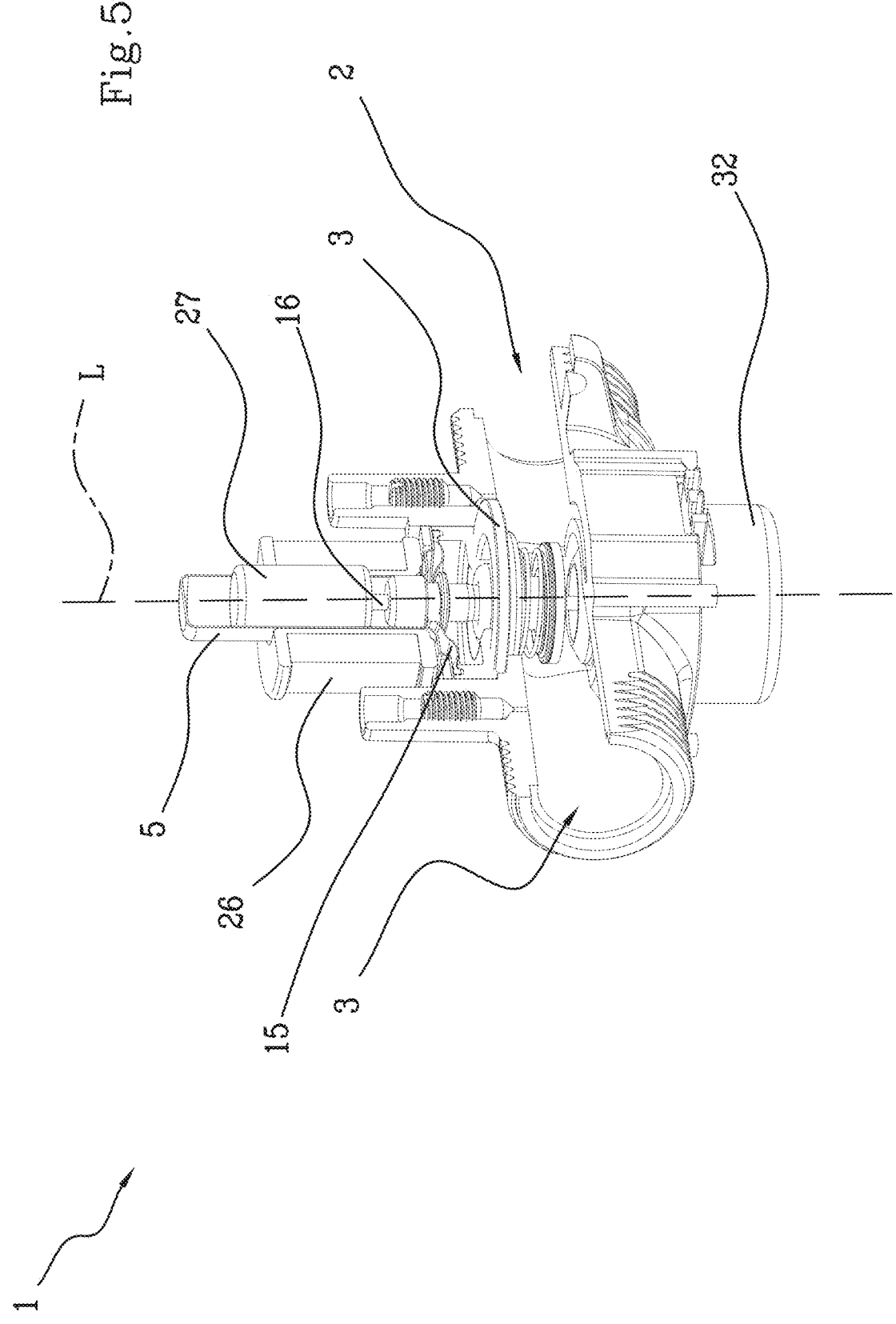
FIG. 5 illustrates a perspective view of the valve for fluids illustrated in FIG. 1 with some components removed to better highlight others.

FIGS. 1, 4, 5 show a valve 1 for fluids, preferably for gases, comprising two consecutive and independent stages, which manage the passage of the predetermined fluid through the same valve 1.

Figure 2:
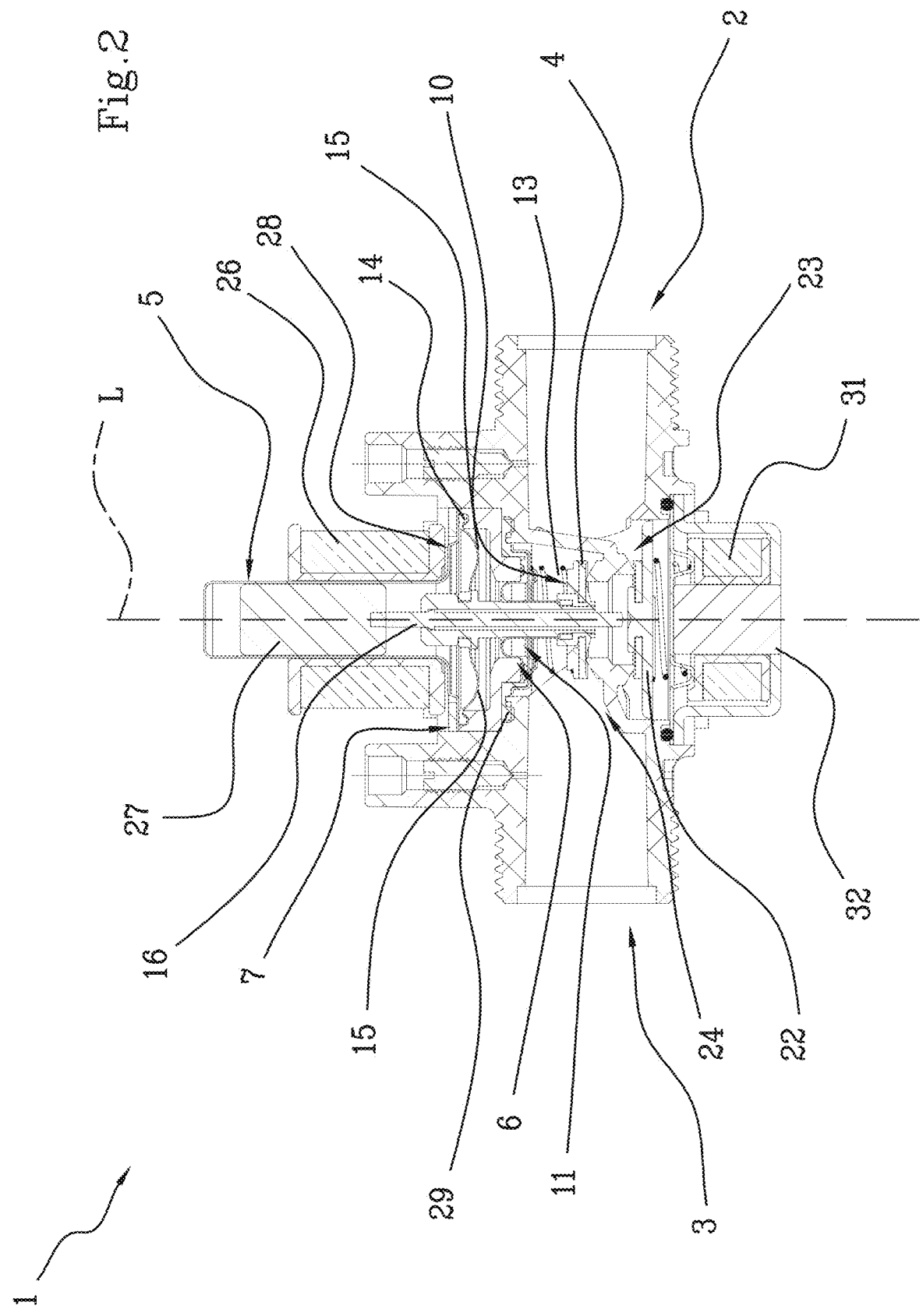
FIG. 2 illustrates a front view of a section according to a transverse plane of the valve for fluids illustrated in FIG. 1 in which the shutter is arranged in the closed position.
Figure 3:
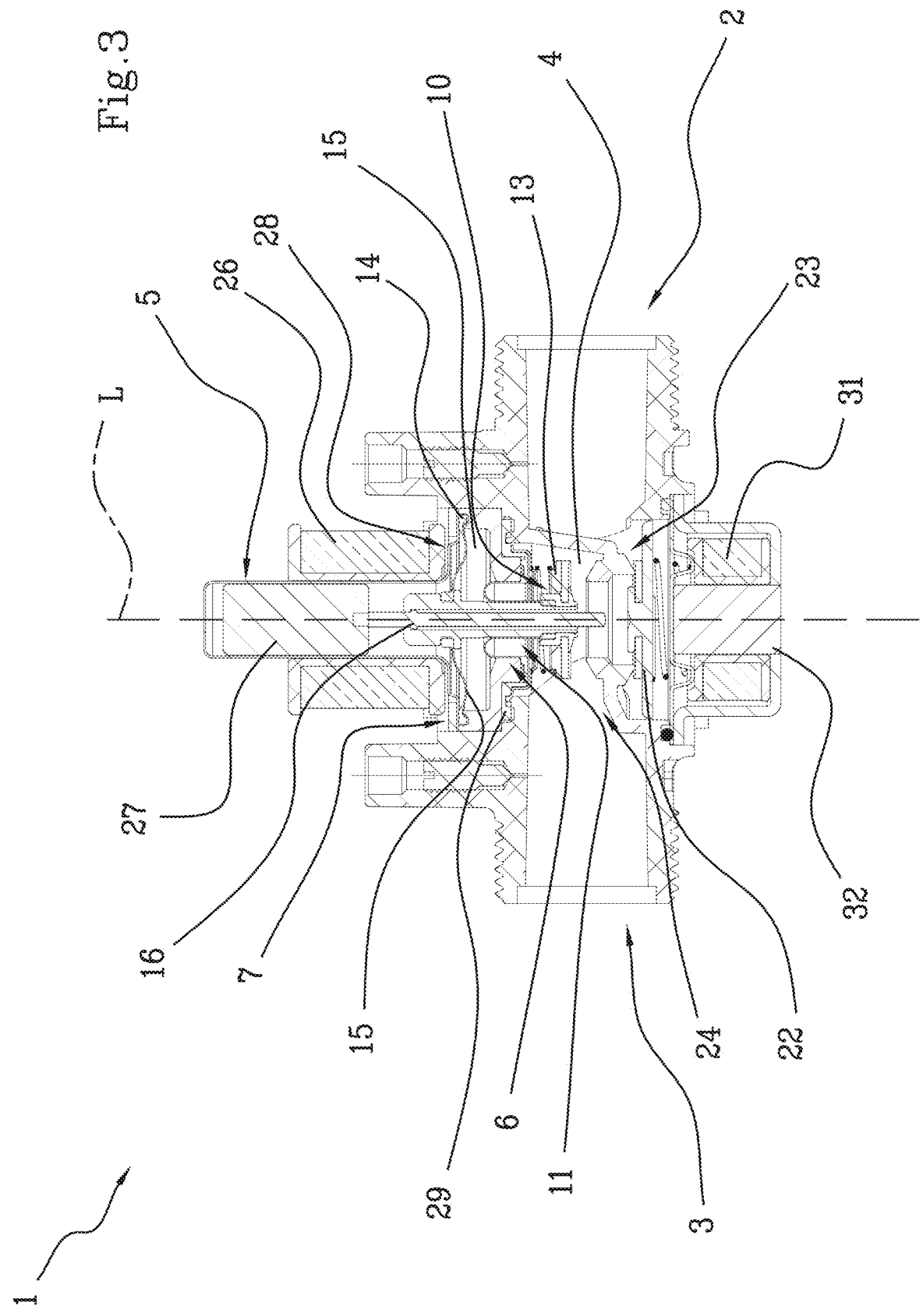
FIG. 3 illustrates a front view of a section according to a transverse plane of the valve for fluids illustrated in FIG. 1 in which the shutter is arranged in the open position.

The second stage of the valve 1, as also shown in FIGS. 2 and 3, comprises an inlet passage 2 and an outlet passage 3 for the fluid between which a primary volume V is defined, a shutter 4 interposed between these passages and movable along a movement direction L between an open position and a closed position. In the open position the shutter 4 allows the flow of the gas from the inlet passage 2 to the outlet passage 3 along a flowing direction, while in the closed position the shutter prevents the flow of the gas.

Furthermore, the second stage comprises an actuating means 26, 27 movable along the movement direction L and operatively active on the shutter 4 for displacing the shutter between the open position, in which it allows the flow of the fluid from the inlet passage 2 to the outlet passage 3, and the closed position, in which it prevents the flow of the fluid.

In particular, the actuating means 26, 27 of the shutter 4 comprises an electromagnet 26 adapted to generate a variable magnetic field and a ferromagnetic element 27 associated with the shutter 4 and movable along the movement direction L as a function of the magnetic field generated by said electromagnet 26 in order to displace the shutter 4 at least from the closed position to the open position or vice versa.

In other words, the ferromagnetic element 27, preferably a permanent magnet, is able to displace itself along the movement direction L as a function of the variation in the intensity of the magnetic field generated by the electromagnet 26. In this way, between electromagnet 26 and ferromagnetic element 27 alternate phases of attraction and repulsion are created which involve a more or less wide movement along the movement direction L of the shutter 4 connected, directly or indirectly, to the ferromagnetic element 27.

Advantageously, the actuating means 26, 27 comprises a tubular body 5 at least partially interposed between the electromagnet 26 and the ferromagnetic element 27 so as to keep correctly aligned the magnetic element 27 during its displacement along the movement direction L under the influence of the magnetic field variation.

Even more advantageously, the tubular body 5 is configured to ensure a physical separation between the magnetic or ferromagnetic element 27 and the fluid capable of passing through valve 1.

According to one aspect of the invention, the tubular body 5 develops between the magnetic element 27 and the electromagnet 26.

The electromagnet is preferably arranged in a static position with respect to a fixed portion 7 of the valve 1, while the ferromagnetic element 27 is slidably inserted through the tubular body 5 for moving along the movement direction L as a function of the magnetic field generated by the electromagnet 26.

Advantageously, the tubular body 5 is made of non-magnetic (or amagnetic) material so as not to absorb part of the magnetic field produced by the electromagnet 26 and, therefore, so as not to alter the movement of the ferromagnetic element 27.

Even more advantageously, unlike the prior art, valve 1 has no covering elements, generally made of magnetic/ferromagnetic material, arranged in correspondence to the electromagnet 26. In other words, according to one aspect of the invention, the electromagnet 26 is directly facing an environment outside valve 1, while it is separated from the magnetic element 27 by the tubular body 5.

However, if necessary, it would be possible to prepare a covering element made of magnetic or ferromagnetic material, as it would not alter the operation of valve 1.

Preferably, the tubular body 5 is made of metallic non-magnetic material so as to considerably reduce the rubbing frictions which can occur between its side walls and the ferromagnetic element 27 during the movement of the latter.

Alternatively, the tubular body 5 is made of plastic material.

According to an aspect of the invention, also visible in FIG. 5, the tubular body 5 has a transverse section which is complementarily shaped with respect to a transverse section of the ferromagnetic element 27. In particular, the transverse sections are defined according to a plane which is orthogonal to the movement direction L.

Advantageously, therefore, between the tubular body 5 and the ferromagnetic element 27 there are no empty gaps that would allow the inclination of the ferromagnetic element 27 during its displacement along the movement direction altering the efficiency of the shutter 4 mainly during the closing step for closing the passage of the fluid through the valve 1.

According to another aspect of the invention, the electromagnet 26 has a circular transverse section that surrounds the tubular body 5.

According to a further aspect of the invention, the tubular body 5 extends along the movement direction L for a predefined length so as to form a hollow cylinder. The ferromagnetic element 27 also extends along the movement direction L for a length less than that of the tubular body 5 so as to substantially define a cylindrical magnet able of translating within the tubular body 5 without impediments.

Preferably, the tubular body 5 extends along the direction of movement L for a length that exceeds a height at the electromagnet 26, so that the movement of the magnetic element 27 makes the latter move along the entire length of the electromagnet 26 and even beyond at least in part.

In particular, the magnetic element 27 is shaped in such a way as to remain at least partially within the encumbrance defined by the electromagnet 26 to be immersed in the electromagnetic field generated by the latter during its translation along the direction of movement L. Even more preferably, during the translation of the magnetic element 27, the latter must not project itself totally beyond the electromagnet 26, nor be totally superimposed on it.

Alternatively, if magnetic element 27 were to have a shape different from that of the cylinder, such as a prism, the geometrical shape of tubular element 5 would vary accordingly.

For example, magnetic element 27 may have a hexagonal section that can slide inside the tubular body 5. In this way, it is advantageous to reduce the distance between the edges of the hexagon and the inner diameter of tubular body 5, while ensuring the passage of gas between the same tubular body 5 and the magnetic element 27.

In this way, it is possible to achieve a high coupling precision between the tubular body 5 and the magnetic element 27, avoiding the risk of obtaining a "piston effect" or the possible risk of blocking the magnetic element 27 inside the tubular body 5 due to the infiltration of foreign substances.

An embodiment of the invention envisages that the electromagnet 26 comprises an electric coil arranged in a static position with respect to the fixed portion 7 of the valve 1 so as to surround the tubular body 5.

Preferably, the tubular body 5 and the ferromagnetic element 27 are at least partially inserted along the coil and, in addition, the tubular body 5 is arranged in a stable position with respect to the fixed portion 7 of the valve 1.

According to an aspect of the invention, the tubular body 5 has an opening facing towards the shutter 4 at which there is an edge 28 connected to the fixed portion 7 of the valve 1. In addition, the tubular body 5 has a bottom cover opposite the opening such as to close the tubular body 5.

According to a preferred aspect of the invention, the actuating means 26,27 comprises an actuating shaft 16 which extends along the movement direction L from a first end connected to the ferromagnetic element 27 towards an operating end arranged in the primary volume V and associated with the shutter 4.

In this way, the actuating shaft 16 is able to transmit the movement of the magnetic element 27 to the shutter 4, moving the latter at least in the open position.

Preferably, the actuating shaft 16 is made of a metallic non-magnetic material.

Alternatively, the actuation shaft 16 is made of a magnetic and/or ferromagnetic material.

According to an aspect of the invention, while the actuating shaft 16 moves the shutter 4 into the open position, an elastic element 13 is interposed between the fixed portion 7 of the valve 1 and the shutter 4 itself for displacing it or keeping it in the closed position.

The elastic element 13, preferably a spring working in extension, allows displacing and/or keeping the shutter in the closed position, being able to apply a pressing force directly on the rear surface 10 of the shutter, distancing it from a separation membrane 6, if any.

Thanks to the presence of the elastic element 13, which produces pressing forces both on the shutter 4 and on the fixed portion 7 of the valve 1, it is possible to keep the separation membrane 6 in a stable position with respect to the fixed portion 7 of the valve 1 by interposing a portion of the latter directly between the fixed portion 7 and the elastic element 13.

According to an aspect of the invention, the valve 1 comprises a separation membrane 6 interposed between the shutter 4 and a fixed portion 7 of the valve 1 so as to expose an active wall to the fluid present between the outlet passage 3 and the shutter 4.

Specifically, the active wall has an outer surface arranged at the outlet passage 3 and facing towards a rear surface 10 of the shutter 4, which is opposite the inlet passage 2 of the valve 1. The outer surface is conformed so that the force due to the pressure of the fluid acting on the active wall is less than the force due to the pressure of the fluid acting on the rear surface 10 of the shutter 4, so as to prevent the pressurised fluid from being able to open the shutter 4 when the latter is in the closed position and the valve 1 is at the same time in a back pressure condition, i.e. a condition in which the fluid flows from the outlet passage 3 towards the inlet passage 2.

In addition, the second stage of the valve 1 comprises a secondary volume W arranged along the movement direction L and separated from the primary volume V by the separation membrane 6.

Substantially, the primary volume V identifies the first stage of the valve, while the secondary volume W identifies the second stage. Most of the fluid flows inside the primary volume V and comprises some components of the valve 1, such as the shutter 4, while further components are arranged in the secondary volume W, such as the actuating means 26, 27.

According to an aspect of the invention, the separation membrane 6 has a connecting portion 14 arranged between the edge 28 of the tubular body 5 and the fixed portion 7 of the valve 1.

According to a possible embodiment of the valve 1, the active wall of the separation membrane 6 is preferably, but not necessarily, inclined with respect to the movement direction L towards a common portion of the shutter 4, assuming the conformation of a cone or a truncated cone.

According to this advantageous conformation, the projection of the outer surface of the active wall of the membrane is smaller than the rear surface of the facing shutter. Consequently, this configuration envisages that the pressing forces induced by the gas on the active wall and on the shutter are unbalanced in favour of the latter, keeping it in the closed position even in the case in which the fluid flows from the outlet passage towards the inlet passage (back pressure).

Preferably, the separation membrane 6 is of the bellows type to follow the displacement of the actuating means 26, 27 along the movement direction L. More precisely, the stabilisation membrane 6 has a bellows portion in its substantially central portion.

According to an alternative embodiment of the valve 1, shown in FIG. 2 and in FIG. 3, the active wall has a concavity 11 that extends away from the shutter 4, substantially along the movement direction L.

According to an aspect of the invention shown in FIGS. 2 and 3, the valve 1 comprises a stabilisation membrane 15 arranged by snap-fitting into the secondary volume W for splitting it into an auxiliary volume U and an intermediate volume Y. More precisely, therefore, the gas is able to reach the auxiliary volume U.

In this way, the intermediate volume Y, defined between the separation membrane 6 and the stabilisation membrane 15, contains only air at a pressure equal to the atmospheric pressure.

According to an aspect of the invention, the separation membrane 6 and the stabilization membrane 15 both perform a function of separation of the volumes inside the valve 1, as well as a function of stabilization of the pressure that the fluid exerts in a condition of normal pressure and in a condition of back pressure (indirectly also on the shutter). Both these functions performed by the membranes guarantee the valve a high level of safety during its use, as both diaphragms prevent unintentional movement of the shutter 4 due to a malfunction or systematic errors during the use of valve 1 itself.

According to an aspect of the invention, the actuating means 26,27 also comprises a tubular element 17 that extends along the movement direction L for putting the primary volume V in fluid connection with the secondary volume W, more precisely with the auxiliary volume U.

Consequently, under normal conditions of use, the separation membrane 6 receives stresses only on its outer surface, i.e. that turned towards the outlet passage 3.

Even more precisely, the tubular element 17 is hollow to allow the insertion of the actuating shaft 16. In order to allow the sliding, the transverse section of the actuating shaft 16 is equal to, or preferably less than, the transverse section of the tubular element 17 so as to put the primary volume V in fluid connection with the secondary volume W, when the further shutter 22 is in a flow position.

Figure 6:
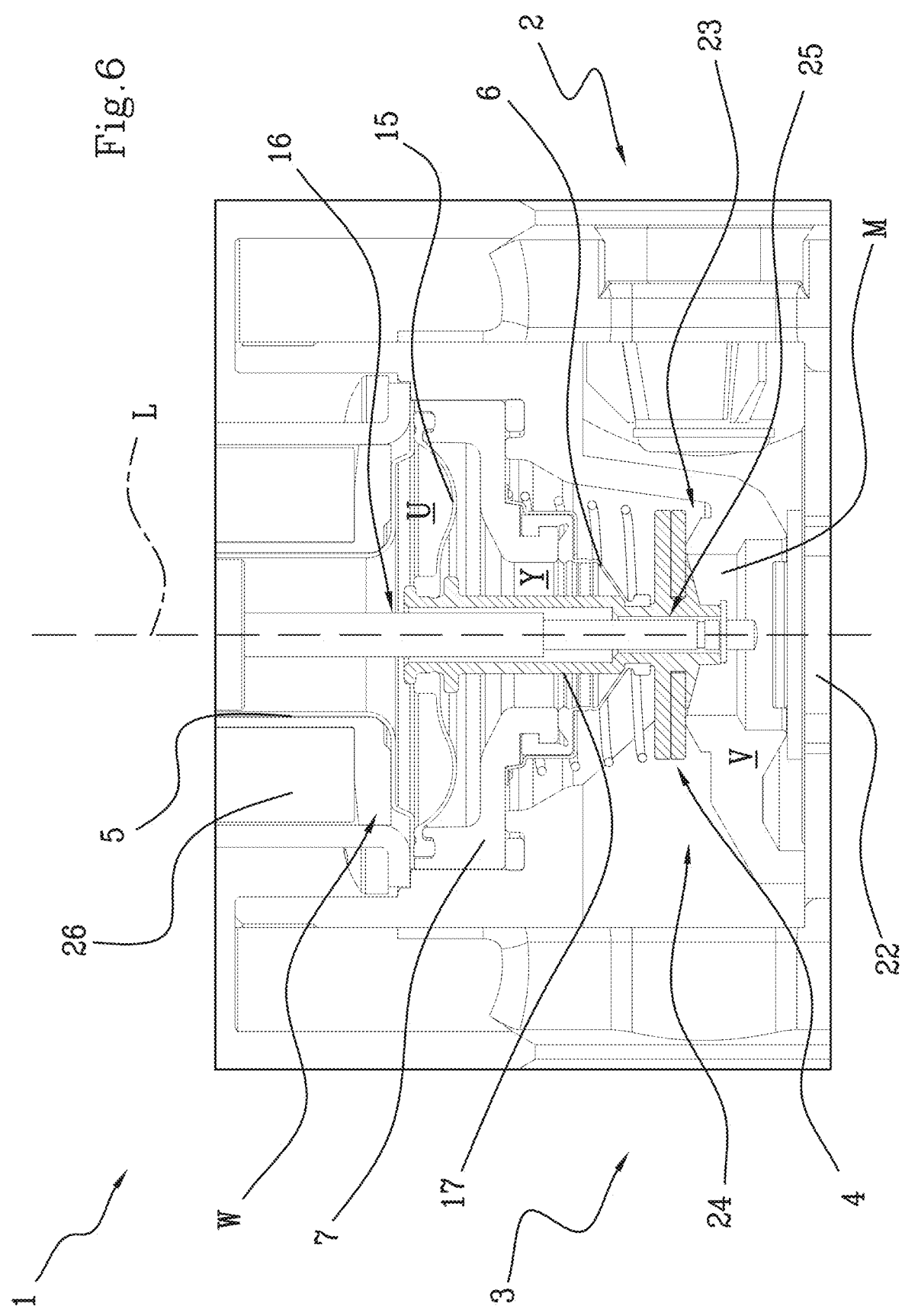
FIG. 6 illustrates a front view of an enlargement of a portion of the valve for fluids shown in FIG. 1.

In other words, as shown in FIG. 6, an interstitial space 25 is defined between the actuating shaft 16 and the tubular element 17, thanks to which the gas flows towards the secondary volume W.

Advantageously, the presence of the stabilisation membrane 15 allows confining this quantity of fluid in the auxiliary volume U, preventing it from flowing towards the intermediate volume Y where it would come into contact with the separation membrane 6.

According to an aspect of the invention, the shutter 4 has a through-hole configured to put the secondary volume W in fluid connection with the inlet passage 2 when the shutter 4 is in the closed or open position and when the valve 1 is under a normal pressure condition. Advantageously, the actuating means 26,27 comprises an interstitial space 25 in fluid communication with the through-hole for defining the passage of the fluid towards the secondary volume W.

Advantageously, when the shutter 4 is in the closed position and at the same time the gas flows between the inlet passage 2 and the outlet passage 3, the interstitial space 25 allows obtaining a balancing of the pressures induced on the shutter 4 and a stabilisation membrane 15 arranged by snap-fitting in the secondary volume W. In particular, the interstitial space 25 allows part of the gas to flow from the inlet passage 2 towards the secondary volume W, filling it, and causing a thrust pressure on the stabilisation membrane 15 equal and opposite the thrust pressure normally induced on the shutter 4 in order to counteract it.

According to an aspect of the invention, on the side facing towards the secondary volume W of the perimeter of the separation membrane 6 there is a flat surface orthogonal to the movement direction L, which is exposed to the pressure of the fluid so as to apply a thrust pressure on the shutter 4 towards the closed position.

For example, in the case in which the stabilisation membrane 15 is damaged, the presence of a flat surface of separation between the separation membrane 6 and the fixed portion 7 of the valve 1 allows the fluid to infiltrate therein. As a function of the fluid pressure, the separation membrane 6 is movable along the movement direction so as to apply a pressing force on the shutter 4 which keeps it in the closed position.

According to a further aspect of the invention, this flat surface of the separation membrane 6 has a blind cavity such as to contain a quantity of fluid infiltrated between the separation membrane 6 and the fixed portion 7 so as to apply a thrust pressure on the shutter 4 towards the closed position.

The fluid infiltrated between the separation membrane 6 and the fixed portion 7 is advantageously stored in the blind cavity in order to apply the necessary pressing force on the shutter to keep it in the closed position.

According to an aspect of the invention, the valve 1 comprises a rigid cover superimposed on the separation membrane 6 and is movable along the movement direction as a function of the quantity of fluid stored in the blind cavity. Advantageously, the rigid cover not being constrained to any component but being simply superimposed on the separation membrane 6 ensures protection to the same separation membrane 6 and, moreover, is able to more efficiently apply the pressing force on the shutter 4 induced by the quantity of fluid infiltrated into the blind cavity.

In other words, the pressure of the fluid infiltrated into the blind cavity creates a thrust force on the rigid cover, which in turn is able to press on the elastic element, increasing its load and, therefore, increasing the closing force on the shutter 4. If the rigid cover is not present, the same action would be indirectly induced on the elastic element 13 with the interposition of a portion of the separation membrane 6.

FIG. 2 and FIG. 3 also illustrate the first stage of the valve 1, which comprises a further shutter 22 interposed between the passages 2,3 and movable along the movement direction L between a flow position and a locked position. In the flow position, the further shutter 22 allows the passage of the gas towards the shutter 4, while in the locked position it prevents this passage of gas. A further actuating means is connected to the further shutter 22, which actuating means is controlled by an electromagnet 31 arranged in a suitable box-shaped body 32 partially inserted in the valve 1. The box-shaped body 32 is arranged along the movement direction L outside the valve 1.

A tertiary volume M forming part of the primary volume V, which has an inlet opening 23 in fluid communication with the inlet passage 2 and an outlet opening 24 in fluid communication with the outlet passage 3, is defined between the shutter 4 and the further shutter 22. In this way, the shutter 4 abuts on the outlet opening 24 when it is in the closed position, while the further shutter 22 abuts on the inlet opening 23 when it is in the locked position.

The tertiary volume M extends along the movement direction L, so that the inlet opening 23 and the outlet opening 24 are arranged transversely with respect to the inlet passage 2 and to the outlet passage 3. Consequently, the flow of the gas does not follow a linear path when passing from the inlet passage 2 to the outlet passage 3.

According to one aspect of the invention, in normal use conditions of the valve 1, the gas is able to flow through the primary volume V when the shutter 4 is in the open position and the further shutter 22 is in the flow position.

However, when the further shutter 22 abuts in the open position, part of the gas is able to reach the secondary volume W.

According to a preferred aspect of the invention, the actuating shaft 16 is common to both shutters 4,22 and is configured to move them independently with respect to one another.

Specifically, the actuating shaft 16 passes through the stabilisation membrane 15, the separation membrane 6 and the shutter 4.

More precisely, the actuating shaft 16, inserted through the tubular element 17, extends at least from the secondary volume W towards an operating end arranged in the primary volume V. This operating end is used for moving the further shutter 22 from the flow position to the locked position.

While the actuating shaft 16 moves the further shutter 22 into the flow position, a specific elastic element, such as a spring, is able to reposition it in the locked position.

In a back pressure condition of the valve 1, i.e. a condition in which the flowing of the gas takes place from the outlet passage 3 towards the inlet passage 2, the pressing force which the gas exerts on the separation membrane 6 increases with respect to normal conditions. The valve 1, under this condition of greater stress, must be able to ensure an isolation of the outlet passage 3 from the rest of the primary volume V. To this end, the separation membrane 6 comprises a sleeve arranged adjacent to at least part of the actuating means 26,27, in particular to the actuating shaft 16, for being constrained to the latter at the shutter 4 and define a physical separation of the primary volume V when the shutter 4 is in the closed position. Specifically, the separation membrane 6 surrounds the movement direction L of the actuating means 26,27 and lies on a plane substantially orthogonal to the axis itself.

Advantageously, the sleeve allows a very good adhesion with the actuating means 26, 27, in such a way that the separation membrane 6 remains integral therewith during the movement of the shutter 4 between the closed position and the open position.

With regard to an operating example of the valve 1 for fluids, preferably for gases, it derives directly from what is described above and which is referred to below.

Under normal conditions, the further shutter 22 is in the locked position due to the further actuating means preferably through a spring interposed between the box-shaped body 32 and the further shutter 22.

In this condition the gas is able to flow from the inlet passage 2 only to the portion of primary volume V comprised between the further shutter 22 and the entrance of the inlet passage 2.

The activation of the actuating means 26,27 allows the displacement of the actuating shaft 16 along the movement direction L. When the operating end of the actuating shaft 16 collides with the further shutter 22, the latter displaces itself from the locked position towards the flow position along the movement direction L. At a certain distance from the box-shaped body 32, the field lines generated by the electromagnet 31 of the further actuating means are able to interact with a magnetic and/or ferromagnetic portion of the further shutter 22 so as to cause it to complete its stroke, up to abutting in the flow position in which it is kept.

Advantageously, the actuating shaft 16 passes through the shutter 4 thanks to a suitable through-cavity present on the latter. In this way, this process does not interfere in any way with the positioning of the shutter 4, the shutter 4 and the further shutter 22 are able to be moved independently of one another.

In this configuration the gas is able to flow to the inside of the tertiary volume M, in which it finds the obstacle of the shutter 4, which is kept in the closed position by the elastic element 13, which is also generally a spring.

As long as the further shutter 22 is kept in the flow position by the electromagnet 31, the actuating means 26, 27 of the shutter 4 is able to displace the actuating shaft 16 along the movement direction L, moving the operating end away from the further shutter 22. In this way, an abutment 29 present on the actuating shaft 16 allows the displacement by mechanical interference of the shutter 4 dragging it from the closed position to the open position, counteracting the force exerted by the elastic element 13 on the shutter 4 to keep it in the closed position.

Preferably, the abutment 29 is a circular ring with a section greater than the through-cavity of the shutter 24.

In this configuration the gas is able to flow from the tertiary volume M to the outlet passage 3.

Advantageously, the positioning of the shutter 4 is independent of the positioning of the further shutter 22, therefore a possible configuration of the valve provides that the further shutter 22 is in the locked position during the displacement of the shutter 4 from the closed position to the open position, in such a way as to only allow the gas contained in the tertiary volume M to flow outside the valve 1 through the outlet passage 3.

Advantageously, the invention allows making the device safer during the back pressure condition, as the first stabilisation membrane is conformed in such a way that the pressure of the gas does not induce a displacement of the shutter from the closed position to the open position allowing the flow of the gas itself towards the inlet passage.

What is claimed is:

1. A valve for gases, having two consecutive and independent stages: a first stage and a second stage wherein the second stage comprises:
    an inlet passage and an outlet passage for the gas between which a primary volume (V) is defined;
    at least one shutter interposed between the inlet passage and the outlet passage and movable along a movement direction (L) between an open position, in which it allows the flow of the gas from the inlet passage to the outlet passage, and a closed position, in which it prevents the flow of the gas;
    an actuator of the shutter comprising an electromagnet adapted to generate a variable magnetic field and a magnetic element associated with said shutter and movable along said movement direction (L) as a function of the magnetic field generated by said electromagnet for moving the shutter at least from the closed position into the open position or vice versa;
    a separation membrane interposed between said shutter and said fixed portion of the valve to separate said primary volume (V) from a secondary volume (W) arranged along the movement direction (L); said separation membrane being conformed to expose an active wall to the fluid present between the outlet passage and the shutter; and
    a stabilisation membrane arranged by snap-fitting into the second volume (W) for splitting it into an auxiliary volume (U) and an intermediate volume (Y); said intermediate volume (Y) being comprised between the separation membrane and the stabilisation membrane for containing a fluid at a pressure substantially equal to the atmospheric pressure value,
    wherein said actuator comprises an actuating shaft extending along the movement direction (L) from a first end connected to said magnetic element towards an operating end arranged in said primary volume (V) and associated with said shutter,
    wherein the separation membrane has a connecting portion arranged between said edge of said tubular body and said fixed portion,
    wherein a first stage comprises a further shutter arranged in the primary volume (V) and movable along the movement direction (L) between a flow position, in which it allows the passage of the gasses towards the shutter, and a locked position, in which it prevents the passage of the gasses; and wherein said actuating shaft is common to both shutters and is configured to move them independently with respect to one another, and
    wherein said actuator comprises a tubular body at least partially interposed between said electromagnet and said magnetic element; said electromagnet being arranged in a static position with respect to a fixed portion of the valve and said ferromagnetic element being slidably inserted in said tubular body for moving along said movement direction (L) as a function of the magnetic field generated by said electromagnet; said tubular body being made of non-magnetic material.

2. The valve according to claim 1, wherein said tubular body has a transverse section complementarily shaped with respect to a transverse section of said magnetic element; said transverse sections being defined according to a plane which is orthogonal to said movement direction (L).

3. The valve according to claim 1, wherein said electromagnet has a circular transverse section that surrounds said tubular body.

4. The valve according to claim 1, wherein said tubular body extends along said movement direction (L) for a predefined length, and said electromagnet extends along said movement direction (L) for a length less than that of said tubular body.

5. The valve according to claim 1, wherein said electromagnet comprises an electric coil arranged in a static position with respect to said fixed portion of said valve (1).

6. The valve according to claim 5, wherein said tubular body and said magnetic element are at least partially inserted along said coil; said tubular body being arranged in a stable position with respect to said fixed portion of said valve.

7. The valve according to claim 1, wherein said tubular body has an opening facing towards the shutter; said opening having an edge connected to said fixed portion of the valve (1); said tubular body having a bottom cover opposite said opening to close said tubular body.

8. The valve according to claim 1, wherein the actuator comprises a tubular element extending along the movement direction (L) within which the actuating shaft is inserted for putting the primary volume (V) in fluid connection with the auxiliary volume (U).

9. The valve according to claim 1, comprising an elastic element interposed between the fixed portion of the valve and the shutter for moving and/or keeping the shutter in the closed position.

10. The valve according to claim 1, wherein said shutter has a through-hole configured to put said secondary volume (W) in fluid connection with said inlet passage when the shutter is in the closed position and when the valve is under a normal pressure condition; said actuator comprising an interstitial space in fluid communication with said through-hole for the passage of the gas towards said secondary volume (W).

11. The valve according to claim 10, wherein said interstitial space and said through-hole are configured to put said inlet passage in fluid communication with said auxiliary volume (U) so that the gas under normal pressure condition acts on the stabilisation membrane to counterbalance the pressure induced on the shutter.

12. The valve according to claim 1, comprising a tertiary volume (M) interposed between the shutter and further shutter having an inlet opening in fluid communication with the inlet passage and an outlet opening in fluid communication with the outlet passage; said shutter abutting on said outlet opening when in the closed position; said further shutter abutting on said inlet opening when in the locked position.

13. The valve according to claim 12, wherein the actuating shaft is inserted in the intermediate volume (M) so that the operating end interacts with the further shutter.

14. A valve for gases, having two consecutive and independent stages: a first stage and a second stage wherein the second stage comprises:

an inlet passage and an outlet passage for the gas between which a primary volume (V) is defined;

at least one shutter interposed between the inlet passage and the outlet passage and movable along a movement direction (L) between an open position, in which it allows the flow of the gas from the inlet passage to the outlet passage, and a closed position, in which it prevents the flow of the gas;

an actuator of the shutter comprising an electromagnet adapted to generate a variable magnetic field and a magnetic element associated with said shutter and movable along said movement direction (L) as a function of the magnetic field generated by said electromagnet for moving the shutter at least from the closed position into the open position or vice versa; and a separation membrane interposed between said shutter and said fixed portion of the valve to separate said primary volume (V) from a secondary volume (W) arranged along the movement direction (L); said separation membrane being conformed to expose an active wall to the fluid present between the outlet passage and the shutter;

wherein said actuator comprises an actuating shaft extending along the movement direction (L) from a first end connected to said magnetic element towards an operating end arranged in said primary volume (V) and associated with said shutter;

wherein a first stage comprises a further shutter arranged in the primary volume (V) and movable along the movement direction (L) between a flow position, in which it allows the passage of the gasses towards the shutter, and a locked position, in which it prevents the passage of the gasses; and wherein said actuating shaft is common to both shutters and is configured to move them independently with respect to one another, wherein said shutter has a through-hole configured to put said secondary volume (W) in fluid connection with said inlet passage when the shutter is in the closed position and when the valve is under a normal pressure condition; said actuator comprising an interstitial space in fluid communication with said through-hole for the passage of the gas towards said secondary volume (W), and wherein said actuator comprises a tubular body at least partially interposed between said electromagnet and said magnetic element; said electromagnet being arranged in a static position with respect to a fixed portion of the valve and said ferromagnetic element being slidably inserted in said tubular body for moving along said movement direction (L) as a function of the magnetic field generated by said electromagnet; said tubular body being made of non-magnetic material.

15. The valve according to claim 14, wherein said tubular body has a transverse section complementarily shaped with respect to a transverse section of said magnetic element; said transverse sections being defined according to a plane which is orthogonal to said movement direction (L).

16. The valve according to claim 14, wherein said electromagnet has a circular transverse section that surrounds said tubular body.

17. The valve according to claim 14, wherein said tubular body extends along said movement direction (L) for a predefined length, and said electromagnet extends along said movement direction (L) for a length less than that of said tubular body.

18. The valve according to claim 14, wherein said electromagnet comprises an electric coil arranged in a static position with respect to said fixed portion of said valve (1).

19. The valve according to claim 18, wherein said tubular body and said magnetic element are at least partially inserted along said coil; said tubular body being arranged in a stable position with respect to said fixed portion of said valve.

20. The valve according to claim 14, wherein said tubular body has an opening facing towards the shutter; said opening having an edge connected to said fixed portion of the valve (1); said tubular body having a bottom cover opposite said opening to close said tubular body.

21. The valve according to claim 14, wherein the separation membrane has a connecting portion arranged between said edge of said tubular body and said fixed portion.

22. The valve according to claim 21, comprising a stabilisation membrane arranged by snap-fitting into the second volume (W) for splitting it into an auxiliary volume (U) and an intermediate volume (Y); said intermediate volume (Y) being comprised between the separation membrane and the stabilisation membrane for containing a fluid at a pressure substantially equal to the atmospheric pressure value.

23. The valve according to claim 22, wherein the actuator comprises a tubular element extending along the movement direction (L) within which the actuating shaft is inserted for putting the primary volume (V) in fluid connection with the auxiliary volume (U).

24. The valve according to claim 14, comprising an elastic element interposed between the fixed portion of the valve and the shutter for moving and/or keeping the shutter in the closed position.

25. The valve according to claim 24, wherein said interstitial space and said through-hole are configured to put said inlet passage in fluid communication with said auxiliary volume (U) so that the gas under normal pressure condition acts on the stabilisation membrane to counterbalance the pressure induced on the shutter.

26. The valve according to claim 14, comprising a tertiary volume (M) interposed between the shutter and further shutter having an inlet opening in fluid communication with the inlet passage and an outlet opening in fluid communication with the outlet passage; said shutter abutting on said outlet opening when in the closed position; said further shutter abutting on said inlet opening when in the locked position.

27. The valve according to claim 26, wherein the actuating shaft is inserted in the intermediate volume (M) so that the operating end interacts with the further shutter.

* * * * *